United States Patent [19]

Franz et al.

[11] Patent Number: 5,271,078
[45] Date of Patent: Dec. 14, 1993

[54] DEVICE FOR COUPLING AND/OR DECOUPLING BEAMS OF LIGHT, WITH AN INTEGRATED OPTICAL COMPONENT

[75] Inventors: Andreas Franz, Kienberg; Michael Allgauer, Stein/Traun, both of Fed. Rep. of Germany

[73] Assignee: Dr. Johannes Heidenhain GmbH, Traunreut, Fed. Rep. of Germany

[21] Appl. No.: 886,326

[22] Filed: May 20, 1992

[30] Foreign Application Priority Data

May 24, 1991 [EP] European Pat. Off. ........ 91108389.7

[51] Int. Cl.$^5$ ............................................. G02B 6/34
[52] U.S. Cl. ........................................ 385/37; 385/14
[58] Field of Search ..................... 356/354, 355, 356; 250/237 G; 359/558, 556; 385/20, 21, 37, 14, 9, 10, 4

[56] References Cited

U.S. PATENT DOCUMENTS

| 4,671,607 | 6/1987 | Laude | 385/37 |
| 4,923,300 | 5/1990 | Dieter et al. | 356/356 |
| 4,938,595 | 7/1990 | Parriaux et al. | 356/356 |
| 4,955,718 | 9/1990 | Michel | 250/237 G |
| 5,026,162 | 6/1991 | Langdon | 356/354 |
| 5,113,066 | 5/1992 | Michel et al. | 250/237 G |

FOREIGN PATENT DOCUMENTS

| 0151002 | 8/1985 | European Pat. Off. . |
| 0276395A3 | 8/1988 | European Pat. Off. . |
| 0276395A2 | 8/1988 | European Pat. Off. . |
| 0401654 | 12/1990 | European Pat. Off. . |
| 3625327 | 2/1988 | Fed. Rep. of Germany . |
| 3928064 | 3/1991 | Fed. Rep. of Germany . |
| 54-100752 | 8/1979 | Japan ........................... 385/37 |

OTHER PUBLICATIONS

Ura, S. et al., "Integrated-Optic-Interferometer Position Sensor", Journal of Lightwave Technology, vol. 7, No. 2, pp. 270-273 Feb. 89.
Burns et al., "3X2 Channel Waveguide Gyroscope Couplers: Theory," IEEE Journal of Quantum Electronics, vol. QE-18, No. 10, pp. 1790-1796 (Oct. 1982).
English Abstract of Japanese Application No. 62-166333, published on Jul. 2, 1987. Patent Abstracts of Japan, vol. 13, No. 180 (Apr. 1989).

Primary Examiner—Rodney B. Bovernick
Assistant Examiner—John Ngo
Attorney, Agent, or Firm—Willian Brinks Olds Hofer Gilson & Lione

[57] ABSTRACT

A measurement device having a correction grating associated with a gauge and deflects two diffracted partial beams overlappingly, at a very small angle ($\alpha$), onto a single coupling grating. From there, two waveguides located closely beside one another are used to introduce the beams into a coupler and the beams are superimposed and evaluated in a known manner. Thus, a position measuring device can be drastically reduced in its structural size with the aid of an integrated optical component.

24 Claims, 1 Drawing Sheet

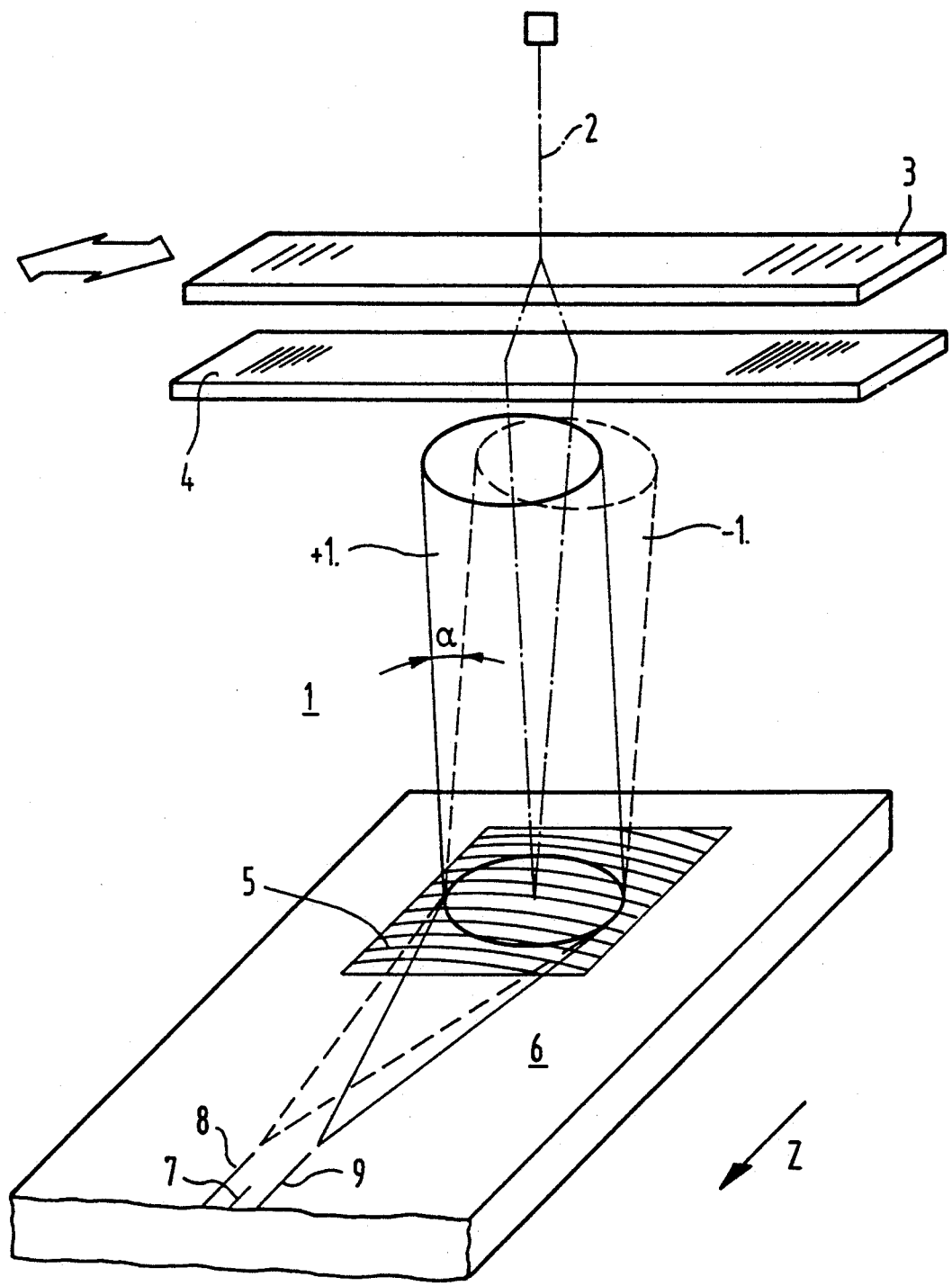

DEVICE FOR COUPLING AND/OR DECOUPLING BEAMS OF LIGHT, WITH AN INTEGRATED OPTICAL COMPONENT

BACKGROUND OF THE INVENTION

Applicants claim, under 35 U.S.C. § 119, the benefit of priority of the filing date of May 24, 1991, of a European application, copy attached, Serial Number 91108389.7, filed on the aforementioned date, the entire contents of which are incorporated herein by reference.

The invention relates to an optical device for coupling and/or decoupling beams of light, having an integrated optical component. Devices of this kind are increasingly used in length and angle measuring technology, to enable producing the smallest possible position measuring instruments that are as invulnerable as possible to malfunction.

A small-sized position measuring instrument is for instance the subject of German Patent DE 36 25 327 Cl. From this patent, and from the prior art discussed in it, it is known in principle to introduce light into fiberoptical waveguides of integrated optical circuits with the aid of coupling gratings. In the prior art, a relatively wide spacing (several millimeters) is necessary between the gauge and the integrated optical component, or between the diffraction gratings, in order to attain a spatial separation of the two measuring beams at the locations of the coupling gratings.

It can also be learned from the prior art that coupling or decoupling gratings are subject to complicated mathematical relationships and typically extend elliptically or parabolically or are even more complicated in structure, as can be seen also from German Patent Disclosure Document DE 39 28 064 Al.

As a consequence of all of these factors, virtually no equipment that includes actually manufactured coupling or decoupling gratings has thus far been developed in actual practice, even though the need for such miniaturized position measuring instruments exists.

The absence of a miniaturized position measuring instrument leads to many disadvantages in prior art devices. For example, prior art instruments have beams which have a large angular separation that when they are coupled into waveguides the waveguides are separated by an amount that requires an extensive coupler to combine the two beams. Having the coupling elements relatively far apart requires the distance between diffraction gratings used to produce the beams to be relatively far apart. This arrangement results in an increase in the sensitivity of the system to tilting and twisting which can cause measurement errors.

Furthermore, the optical travel distances and angular separations are relatively large which require the measurement system to be relatively large in all coordinate directions, such as the Z direction. Also, the large angular separations result in more than one coupling grating being required.

SUMMARY OF THE INVENTION

The present invention relates to an optical device for coupling and/or decoupling beams of light, having an integrated optical component to miniaturize the device resulting in a reduction in the sensitivity of the system in movement of the optical device.

These objects are attained by an optical device for coupling first and second beams of light, having a grating into which said first and second beams of light enter jointly at an angle ($\alpha$) with respect to one another and are diffracted to produce first and second diffracted beams of light. The first and second diffracted beams then enter corresponding first and second waveguides. The beams have such a small angular separation that the waveguides are separated by a relatively small distance.

In another embodiment, the device can decouple first and second beams of light, having a grating into which said first and second beams of light enter jointly at an angle ($\alpha$) with respect to one another and are diffracted to produce first and second diffracted beams of light. The first and second diffracted beams then depart corresponding first and second waveguides. The beams have such a small angular separation that the waveguides are separated by a relatively small distance.

Employing the above-described coupling or decoupling devices advantageously provide an optical device of the type using integrated optical components in which the beams to be introduced, the coupling gratings or decoupling gratings, and the beams of light to be decoupled are adapted in such a way that miniaturized construction is possible. Miniaturization is accomplished by minimizing the optical travel paths and reducing the angular separations of the beams to reduce drastically the size of the measurement system in all coordinate directions, such as the Z direction with the aid of an integrated optical component. The reduced size of the measurement system results in only one coupling grating being required.

Another advantage of the invention is that the distance between diffraction gratings used to produce the beams is relatively close such that the gratings are positioned near each other. This arrangement decreases the sensitivity of the system to tilting and twisting which can cause measurement errors.

The invention will be described below in further detail in terms of an exemplary embodiment, taken in conjunction with the drawing.

BRIEF DESCRIPTION OF THE DRAWING

The single figure of the drawing shows a preferred embodiment of a transmitted-light measuring instrument of the present invention.

DESCRIPTION OF THE PREFERRED EMBODIMENT

In the position measuring instrument designated generally as 1 shown in the figure, a beam of light 2 strikes a gauge 3, which is embodied by a diffraction grating. Two partial beams, for instance of +1st and −1st order of diffraction, are generated at the gauge 3 and on strike a further diffraction grating, shown as a corrective grating 4. At least one gauge 3 and at least one correction grating may be used. Furthermore, it will be recognized by those skilled in the art that gauge 3 and grating 4 may comprise a linear grating or a radial grating.

At the correction grating 4, the two partial beams of +1st order and −1st order are diffracted once again and then strike a coupling grating 5, where they overlap, at a mutual location. The coupling grating 5 comprises a component of an integrated optical component 6. The optical component 6 may include other elements, as are typical in position measuring instruments with integrated optical components. Among these elements, a coupler 7 is also shown, in whose input branches the focusing coupling grating 5 couples the two partial beams of +1st order and 1st order via waveguides 8 and 9 which are located closely beside one another. These waveguides may be fiber optical waveguides.

It is an essential characteristic of the invention that the two partial beams +1st order and −1st order do not strike the substrate of the integrated optical component 6 in parallel fashion but rather are inclined from one another by a small angle $\alpha$ (mrad) at a substantially mutual location. This can be done in various ways, for example by rotating or twisting the correction grating 4 relative to the gauge 3, or by tilting them relative to one another or by means of slightly different grating constants. Combinations of these arrangements may also be used.

Since the two partial beams of +1st order and −1st order are inclined at a very small angle $\alpha$ (~mrad) with respect to each other as they enter the coupling grating 5, this leads, in the use shown of a focusing coupling grating 5, to different foci (focus locations). In this manner, they can be each coupled separately into one waveguide 8 or 9, these waveguides leading into the coupler 7. A suitable coupler of this kind may be a known 2×3 coupler. The theory of such a 2×3 coupler is described, for example, in the publication "3×2 Channel Waveguide Gyroscope Couplers: Theory," Rolliam K. Burns and A. Fenner Milton, IEEE Journal of Quantum Electronics, Vol. QE-18, No. 10, October, 1982, whose disclosure is incorporated herein by reference.

Because of the small resultant angle at which the partial beams +1. and −1. are coupled into the waveguides and 9 of the coupler 7, these waveguides are already located close to each other, no further distance is required in the coupler 7 for joining them to the coupler inputs. This arrangement also results in a shortened structural length in the Z direction.

Since the locations of the coupling elements are no longer relatively far apart, the spacing between the diffraction gratings 3 and 4 can be reduced sharply. This greatly reduces the sensitivity to tilting and twisting of the components, making for only slight measurement errors. In the manner described above, the optical travel distances are drastically shortened according to the invention, so that the structural size of the device is reduced in all the coordinate directions. Moreover, only a single coupling grating 5 is needed.

The invention may be embodied in other forms than those specifically disclosed herein without departing from its spirit or essential characteristics. For example, the invention may employ an integrated decoupling element alone or in combination with an integrated coupling element. Furthermore, the invention may employ coupling and decoupling elements in combination in the same device. The described embodiments are to be considered in all respects only as illustrative and not restrictive, and the scope of the invention is commensurate with the appended claims rather than the foregoing description.

We claim:

1. An optical device for coupling a first and a second beam of light, comprising:
    a grating into which said first and second beams of light enter jointly at an angle ($\alpha$) with respect to one another and are diffracted to produce first and second diffracted beams of light;
    a first waveguide into which said first diffracted beam of light enters;
    a second waveguide into which said second diffracted beam of light enters;
    a source of illumination into whose beam path at least one first diffraction element for generating said first and second diffracted beams is located;
    at least one further diffraction element having a grating constant different than said at least one first diffraction element, wherein said at least one first diffraction element and said at least one further diffraction element product nonparallel said first and second diffracted beams, at a substantially mutual location; and
    at least one integrated coupling grating for coupling the nonparallel diffracted beams at a substantially mutual location into said first and second waveguides.

2. The optical device of claim 1, wherein said at least one first diffraction element comprises a diffraction grating.

3. The optical device of claim 2, wherein said diffraction grating comprises a linear grating.

4. The optical device of claim 2, wherein said diffraction grating comprises a radial grating.

5. An optical device of coupling a first and a second beam of light, comprising:
    a grating into which said first and second beams of light enter jointly at an angle ($\alpha$) with respect to one another lane are diffracted to produce first and second diffracted beams of light;
    a first waveguide into which said first diffracted beam of light enters;
    a second waveguide into which said second diffracted beam of light enters;
    a source of illumination into whose beam path at least one first diffraction element for generating said first and second diffracted beams is located;
    at least one further diffraction element twisted relative to said at least one first diffraction element, wherein said at least one first diffraction element and said at least one further diffraction element produce nonparallel said first and second diffracted beams, at a substantially mutual location; and
    at least one integrated coupling grating for coupling the nonparallel diffracted beams at a substantially mutual location into said first and second waveguides.

6. The optical device of claim 5, wherein said at least one first diffraction element comprises a diffraction grating.

7. The optical device of claim 6, wherein said diffraction grating comprises a linear grating.

8. The optical device of claim 6, wherein said diffraction grating comprises a radial grating.

9. An optical device for coupling a first and a second beam of light, comprising:
    a grating into which said first and second beams of light enter jointly at an angle ($\alpha$) with respect to one another and are diffracted to produce first and second diffracted beams of light;
    a first waveguide into which said first diffracted beam of light tners;
    a second waveguide into which said second diffracted beam of light tners;
    a source of illumination into whose beam path at least one first diffraction element for generating said first and second diffracted beams is located;
    at least one further diffraction element tilted relative to said at least one first diffraction element, wherein said at least one first diffraction element and said at least one further diffraction element produce nonparallel said first and second diffracted beams, at a substantially mutual location; and at least one integrated coupling grating for coupling the nonparallel said first and second diffracted beams at a substantially mutual location into said first and second waveguides.

10. The optical device of claim 9, wherein said at least one first diffraction element comprises a diffraction grating.

11. The optical device of claim 10, wherein said diffraction grating comprises a linear grating.

12. The optical device of claim 10, wherein said diffraction grating comprises a radial grating.

13. An optical device for decoupling a first and a second beam of light, comprising:

a grating into which said first and second beams of light enter jointly at an angle ($\alpha$) with respect to one another and are diffracted to produce first and second diffracted beams of light;

a first waveguide out of which said first diffracted beam of light departs;

a second waveguide out of which said second diffracted beam of light departs;

a source of illumination into whose beam path at least one first diffraction element for generating said first and second diffracted beams is located;

at least one further diffraction element having a grating constant different than said at least one first diffraction element, wherein said at least one first diffraction element and said at least one further diffraction element produce nonparallel said first and second diffracted beams, at a substantially mutual location; and at least one integrated decoupling grating for decoupling the nonparallel said first and second diffracted beams at a substantially mutual location out of said first and second waveguides.

14. The optical device of claim 13, wherein said at least one first diffraction element comprises a diffraction grating.

15. The optical device of claim 14, wherein said diffraction grating comprises a linear grating.

16. The optical device of claim 14, wherein said diffraction grating comprises a radial grating.

17. An optical device for decoupling a first and a second beam of light, comprising:

a grating into which said first and second beams of light enter jointly at an angle ($\alpha$) with respect to one another and are diffracted to produce first and a second diffracted beams of light;

a first waveguide out of which said first diffracted beam of light departs;

a second waveguide out of which said second diffracted beam of light departs;

a source of illumination into whose beam path at least one first diffraction element for generating said first and second diffracted beams is located;

at least one further diffraction element twisted relative to said at least one first diffraction element, wherein said at least one first diffraction element and said at least one further diffraction element produce nonparallel said first and second diffracted beams, at a substantially mutual location; and at least one integrated decoupling grating for decoupling the nonparallel said first and second diffracted beams at a substantially mutual location out of said first and second waveguides.

18. The optical device of claim 17, wherein said at least one first diffraction element comprises a diffraction grating.

19. The optical device of claim 18, wherein said diffraction grating comprises a linear grating.

20. The optical device of claim 18, wherein said diffraction grating comprises a radial grating.

21. An optical device for decoupling a first and a second beam of light, comprising:

a grating into which said first and second beams of light enter jointly at an angle ($\alpha$) with respect to one another and are diffracted to produce first and second diffracted beams of light;

a first waveguide out of which said first diffracted beam of light departs;

a second waveguide out of which said second diffracted beam of light departs;

a source of illumination into whose beam path at least one first diffraction element for generating said first and second diffracted beams is located;

at least one further diffraction element tilted relative to said at least one first diffraction element, wherein said at least one first diffraction element and said at least one further diffraction element produce nonparallel said first and second diffracted beams, at a substantially mutual location; and at least one integrated decoupling grating for decoupling the nonparallel said first and second diffracted beams at a substantially mutual location out of said first and second waveguides.

22. The optical device of claim 21, wherein said at least one first diffraction element comprises a diffraction grating.

23. The optical device of claim 22, wherein said diffraction grating comprises a linear grating.

24. The optical device of claim 22, wherein said diffraction grating comprises a radial grating.

* * * * *

UNITED STATES PATENT AND TRADEMARK OFFICE
CERTIFICATE OF CORRECTION

PATENT NO. : 5,271,078
DATED     : December 14, 1993
INVENTOR(S) : Andreas Franz et al.

It is certified that error appears in the above-indentified patent and that said Letters Patent is hereby corrected as shown below:

In column 2, line 53, delete "on".

In column 3, line 32, after "guides" insert --8--.

In Column 4, line 10, delete "product" and insert --produce--.

In Column 4, line 20, delete "lane" and insert --and--.

In Column 4, line 61, delete "tners" and insert --enters--.

In Column 4, line 63, delete "tners" and insert --enters--.

In Column 5, line 55, delete "a".

Signed and Sealed this

Seventh Day of February, 1995

Attest:

BRUCE LEHMAN

*Attesting Officer*       *Commissioner of Patents and Trademarks*